(12) United States Patent
Singh et al.

(10) Patent No.: US 9,513,999 B2
(45) Date of Patent: Dec. 6, 2016

(54) METHOD AND SYSTEM FOR TRACKING INFORMATION TRANSFERRED BETWEEN STORAGE SYSTEMS

(71) Applicant: NETAPP, INC., Sunnyvale, CA (US)

(72) Inventors: Kanwaldeep Singh, Sunnyvale, CA (US); Austin Diec, San Jose, CA (US); Manoj Sundararajan, Sunnyvale, CA (US)

(73) Assignee: Netapp, Inc., Sunnyvale, CA (US)

( * ) Notice: Subject to any disclaimer, the term of this patent is extended or adjusted under 35 U.S.C. 154(b) by 175 days.

(21) Appl. No.: 14/154,030

(22) Filed: Jan. 13, 2014

(65) Prior Publication Data

US 2015/0199240 A1     Jul. 16, 2015

(51) Int. Cl.
*G06F 11/14*     (2006.01)
*G06F 11/16*     (2006.01)

(52) U.S. Cl.
CPC ........ *G06F 11/1451* (2013.01); *G06F 11/1471* (2013.01); *G06F 11/1612* (2013.01)

(58) Field of Classification Search
CPC .. G06F 3/065; G06F 3/0647; G06F 11/1451; G06F 11/1471; G06F 17/30575; G06F 2201/855
USPC ........................................................ 711/162
See application file for complete search history.

(56) References Cited

U.S. PATENT DOCUMENTS

| | | | |
|---|---|---|---|
| 7,480,780 B2 * | 1/2009 | Kitamura | G06F 3/0605 711/154 |
| 2010/0017573 A1 * | 1/2010 | Shinozaki et al. | 711/162 |

* cited by examiner

*Primary Examiner* — Jasmine Song
(74) *Attorney, Agent, or Firm* — Cooper Legal Group, LLC

(57) ABSTRACT

Methods and systems for tracking information that is transferred from a source to a destination storage system are provided. The source storage system maintains a first data structure for indicating that a storage block has been transferred. The destination storage system receives the storage block and updates a second data structure to indicate that the storage block has been received. The first data structure and the second data structure are compared to determine that the storage block was successfully transferred from the source storage system and received by the destination storage system.

20 Claims, 10 Drawing Sheets

METHOD AND SYSTEM FOR TRACKING INFORMATION TRANSFERRED BETWEEN STORAGE SYSTEMS

TECHNICAL FIELD

The present disclosure relates to storage systems and tracking information that is transferred from a source storage system to a destination storage system.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server" or "storage server"), which is a processing system configured to store and retrieve data on behalf of one or more client computing systems ("clients"). The storage system may be presented to a client system for storing information.

Often information from a source storage system is transferred to a destination storage system using a network link for disaster recovery or any other reason. However, information may not be successfully transferred due to errors involving network links and/or due to various modules that may be involved with a transfer. For reliable disaster recovery, it is desirable to confirm that after a transfer is initiated at the source storage system, the information is actually successfully transferred and received by the destination storage system.

BRIEF DESCRIPTION OF THE DRAWINGS

The various features of the present disclosure will now be described with reference to the drawings of the various aspects of the present disclosure. In the drawings, the same components may have the same reference numerals. The illustrated aspects are intended to illustrate, but not to limit the present disclosure. The drawings include the following Figures.

DETAILED DESCRIPTION

As a preliminary note, as used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computing device. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon.

The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, non-transitory storage media or any other storage device type, in accordance with the claimed subject matter.

The various aspects of the present disclosure provide methods and system for tracking information that is transferred from a source storage system to a destination storage system. The source storage system maintains a first data structure for indicating that a storage block has been transferred. The destination storage system receives the storage block and updates a second data structure to indicate that the storage block has been received. The first data structure and the second data structure can be compared to determine that the storage block was successfully transferred from the source storage system and received by the destination storage system.

Figure 1:
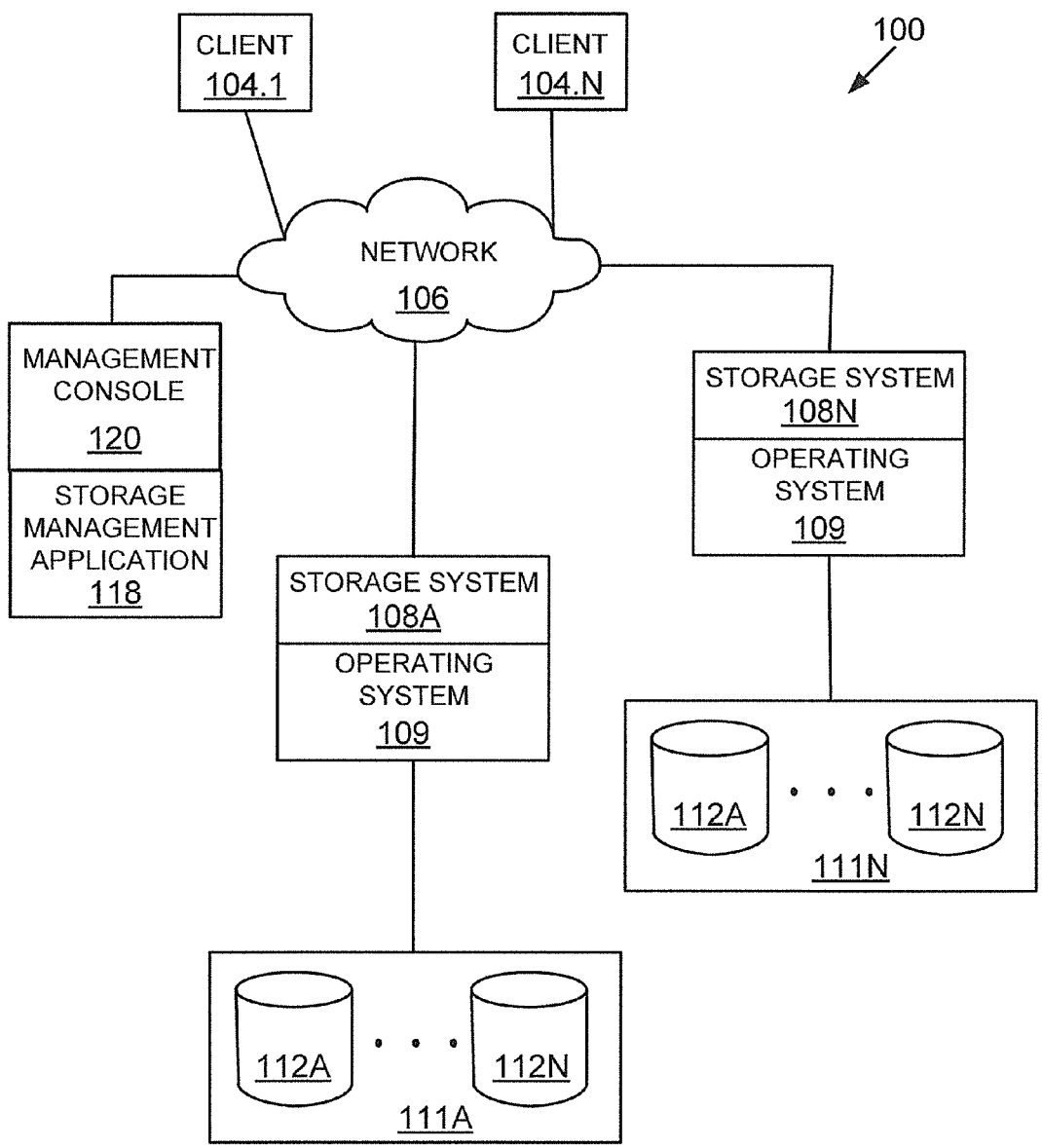
FIG. 1 shows an example of a non-cluster based storage environment, used according to one aspect of the present disclosure.

Non-Clustered Storage Environment 100:

FIG. 1 depicts an illustrative aspect of a non-clustered storage environment 100, including a plurality of client computing systems/devices 104.1-104.N (may also be referred to as client 104 or clients 104), storage systems 108A-108N (may also be referred to as storage system 108 or storage systems 108), a management console 120 and at least one interconnect system (or network) 106 communicably connecting client systems (or computing devices) 104.1-104.N, storage systems 108 and management console 120.

Each storage system 108 may include or interface with a storage subsystem 111 (shown as 111A-111N) having multiple mass storage devices 112A-112N (may also be referred to as storage device or storage devices 112). The mass storage devices 112 may be, for example, conventional magnetic disks, optical disks such as CD-ROM or DVD based storage, magneto-optical (MO) storage, or any other type of non-volatile storage devices suitable for storing structured or unstructured data.

The storage system 108 executes a storage operating system 109 for managing storage space within storage subsystem 111 and presenting storage space to clients 104. As an example, storage operating system 109 maybe the DATA ONTAP® storage operating system, available from NetApp®, Inc., that implements a Write Anywhere File Layout (WAFL®) storage system, or any other suitable storage operating system.

Storage operating system 109 and applications running on the client systems 104.1-104.N communicate according to well-known protocols, such as the NFS protocol or the CIFS protocol, to make data stored on storage device 112 appear to users and/or application programs as though the data were stored locally on the client systems 104.1-104.N. CIFS means the Common Internet File System Protocol, an access protocol that client systems use to request file access services from storage systems over a network. NFS means a Network File System, a protocol that allows a user to access storage over a network.

Storage operating system 109 can present or export data stored at storage devices 112 as a volume (may also be referred to as a storage volume), or one or more qtree sub-volume units, to each of the client systems 104.1-104.N. In one aspect, a volume is a logical data set which is an abstraction of physical storage, combining one or more physical mass storage devices or parts thereof into a single logical storage object. From the perspective of a client system 104, each volume can appear to be a single storage drive. However, each volume can represent the storage space in one storage device, an aggregate of some or all of the storage space in multiple storage devices, a RAID group, or any other suitable set of storage space. Each volume may be configured to store data containers, for example, data files, scripts, word processing documents, executable programs, structured and unstructured data and the like. Specifically, each volume can include a number of individually addressable files.

The storage operating system 109 may implement a high-level module, such as a file system, to logically organize the information stored at storage devices 112 as a hierarchical structure of directories, files, blocks, structured and un-structured data (may be referred to as data containers). For example, each "on-disk" data container may be implemented as set of data structures, i.e., blocks, configured to store information, such as the actual data for storage volumes. These data blocks are organized within a logical volume block number (vbn) space that is maintained by the file system. The file system organizes the storage data blocks within the vbn space as a "logical volume"; each logical volume may be, although is not necessarily, associated with its own file system. The file system typically consists of a contiguous range of vbns from zero to n, for a file system of size n–1 blocks.

In a typical mode of operation, one of the client systems 104.1-104.N transmits one or more I/O (input/output) commands, such as an NFS or CIFS request, over network 106 to the storage system 108 to read or write information. The storage system 108 issues one or more I/O commands to storage device 112 to read or write the data on behalf of the client system. The storage system 108 also issues an NFS or CIFS response containing the requested data over network 106 to the client system.

In some instances, operating system 109 may present storage system 108 to clients as virtual storage systems (may also be referred to as a "vserver" and also referred to as virtual storage system). The virtual storage system is addressable by the client systems and handles input/output commands, just like storage system 108. This allows one to present a physical storage system as multiple virtual storage systems to various clients.

Each virtual storage system is assigned a unique access address that is used by a client to access the storage system. For example, each virtual storage system is assigned an Internet Protocol (IP) address that is used by client 104 to send I/O commands. The IP address may be assigned when a virtual storage system is configured using a management application 118 executed by management console 120.

The management console 120 may be, for example, a conventional PC, workstation, or the like. The storage management application 118 can be a software application, typically used by a storage network administrator to manage a pool of storage devices and other modules of system 100.

Communication between the storage management application 118 and storage system 108 may be accomplished using any of the various conventional communication protocols and/or application programming interfaces (APIs), the details of which are not germane to the technique being introduced here. This communication may be enabled by network 106 or via a direct link (not shown) between the management console 120 and one or more of the storage systems.

The storage blocks (or data stored at the storage blocks) managed by source storage system (for example, 108A) may be transferred to a destination storage system (for example, 108N) for disaster recovery or any other reason. The term block, storage block or "storage unit" are used interchangeably throughout this specification. The various aspects described herein provide a mechanism to track and confirm that storage blocks are successfully transferred from the source system and received by the destination storage system.

Figure 2:
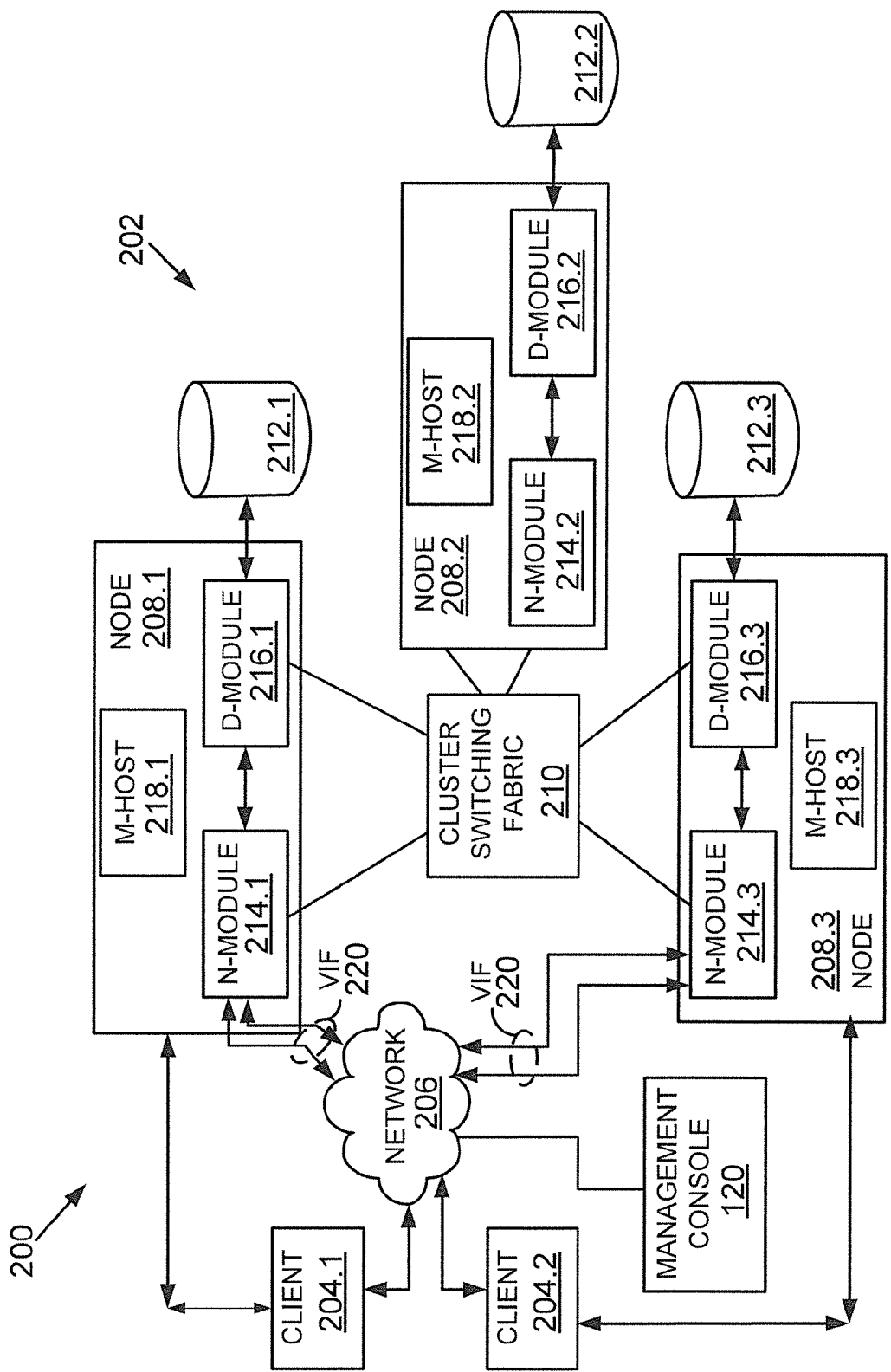
FIG. 2 shows a block diagram of a cluster based storage system, used according to one aspect of the present disclosure.

Clustered Storage Environment 200:

The adaptive aspects described herein can be implemented in a cluster based system that has a distributed architecture, unlike the monolithic architecture of the non-clustered environment. FIG. 2 depicts an illustrative aspect of a clustered storage environment 200 including a plurality of client systems 204.1-204.2 (similar to clients 104.1-104.N), a clustered storage system 202 and at least one computer network 206 communicably connecting the client systems 204.1-204.2 and the clustered storage system 202. The clustered storage system 202 includes a plurality of nodes 208.1-208.3, a cluster switching fabric 210, and a plurality of mass storage devices 212.1-212.3.

Each of the plurality of nodes 208.1-208.3 may be configured to operate as a source storage system or a destination storage system. Each node may include an N-module, a D-module, and an M-host, each of which can be implemented as a separate processor executable or machine implemented module. Specifically, node 208.1 includes an N-module 214.1, a D-module 216.1, and an M-host 218.1, node 208.2 includes an N-module 214.2, a D-module 216.2, and an M-host 218.2, and node 208.3 includes an N-module 214.3, a D-module 216.3, and an M-host 218.3.

The N-modules 214.1-214.3 include functionality that enables the respective nodes 208.1-208.3 to connect to one or more of the client systems 204.1-204.2 over the computer network 206, while the D-modules 216.1-216.3 connect to one or more of the storage devices 212.1-212.3.

The M-hosts 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective N-modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2 depicts only the VIFs 220 at the interfaces to the N-modules 214.1, 214.3 for clarity of illustration.

The clustered storage system 202 can be organized into any suitable number of vservers, in which each virtual storage system represents a single storage system namespace with separate network access. Each vserver has a user domain and a security domain that are separate from the user and security domains of other virtual storage systems. Client systems can access storage space via a VServer from any node of the clustered system 202.

Each of the nodes 208.1-208.3 may be defined as a computer adapted to provide application services to one or more of the client systems 204.1-204.2. The nodes 208.1-208.3 are interconnected by the switching fabric 210, which, for example, may be embodied as a Gigabit Ethernet switch or any other interconnect type.

Although FIG. 2 depicts three N-modules 214.1-214.3, the D-modules 216.1-216.3, and the M-Hosts 218.1-218.3, any other suitable number of N-modules, D-modules, and M-Hosts may be provided. There may also be different numbers of N-modules, D-modules, and/or M-Hosts within the clustered storage system 202. For example, in alternative aspects, the clustered storage system 202 may include a plurality of N-modules and a plurality of D-modules interconnected in a configuration that does not reflect a one-to-one correspondence between the N-modules and D-modules.

The client systems 204.1-204.2 of FIG. 2 may be implemented as general-purpose computers configured to interact with the respective nodes 208.1-208.3 in accordance with a client/server model of information delivery. In the presently disclosed aspect, the interaction between the client systems 204.1-204.2 and the nodes 208.1-208.3 enable the provision of network data storage services. Specifically, each client system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.2 may issue packets according to file-based access protocols, such as the NFS or CIFS protocol, when accessing information in the form of files and directories.

Figure 3A:
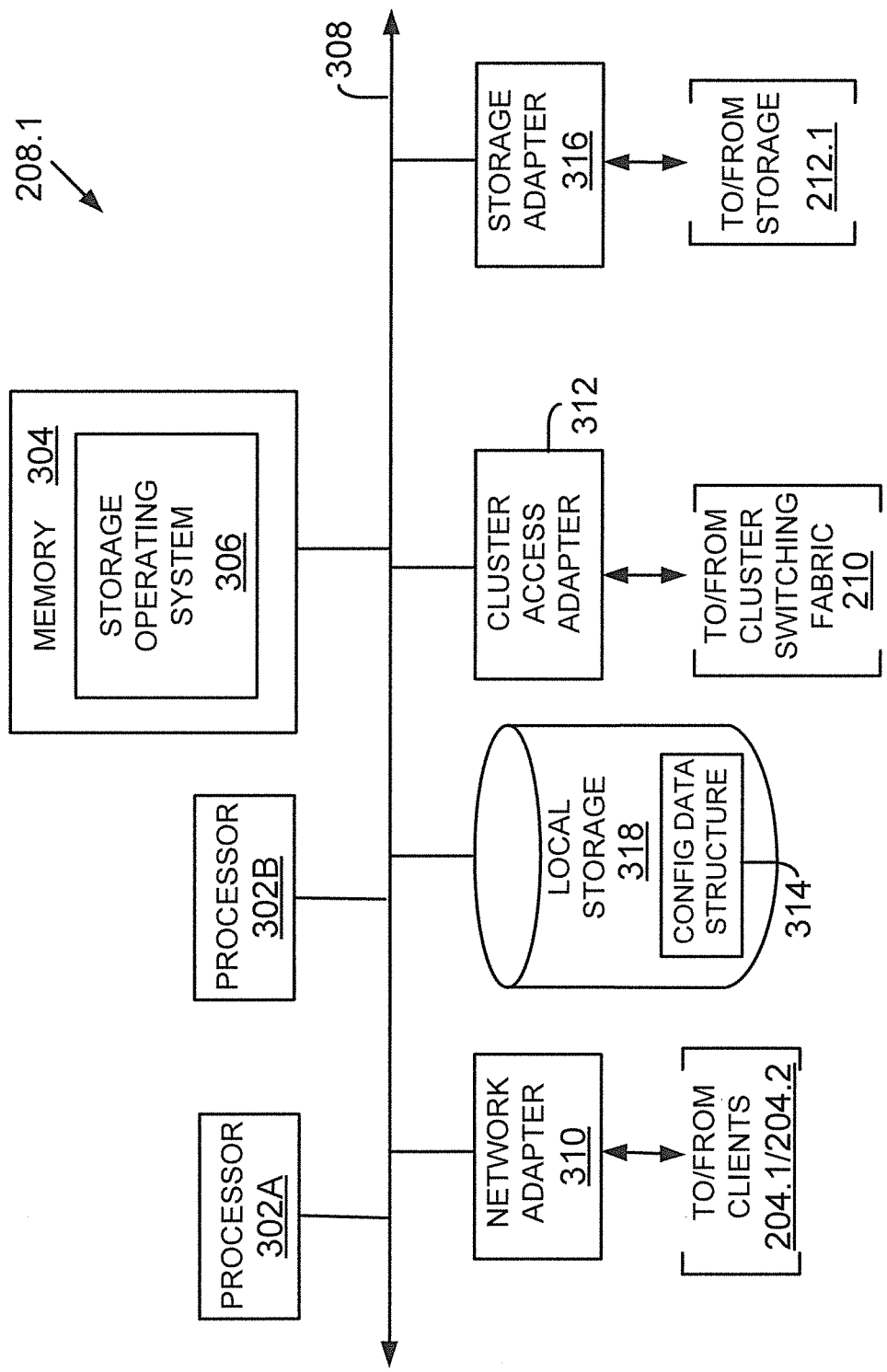
FIG. 3A shows an example of a node used in a cluster based storage system, used according to one aspect of the present disclosure of the present disclosure.

Storage System Node 208.1:

FIG. 3A is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. The local storage 313 comprises one or more storage devices utilized by the node to locally store configuration information (e.g., in a configuration data structure 314) as well as log files that are described below in detail.

Node 208.1 may manage a plurality of storage volumes that are transferred from a source node to a destination node. The system and processes for tracking the transferred storage blocks corresponding to the storage volumes are described below in more detail.

The cluster access adapter 312 comprises a plurality of ports adapted to couple node 208.1 to other nodes of cluster 100. In the illustrative aspect, Ethernet (or any other protocol) may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 312 is utilized by the N/D-module for communicating with other N/D-modules in the cluster 100.

Each node 208.1 is illustratively embodied as a dual processor storage system executing a storage operating system 306 (similar to 109, FIG. 1) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the N-module 104 on the node, while the other processor 302B executes the functions of the D-module 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the present disclosure.

The storage operating system 306, portions of which is typically resident in memory and executed by the processing elements, functionally organizes the node 208.1 by, inter alia, invoking storage operations in support of the storage service implemented by the node.

The network adapter 310 comprises a plurality of ports adapted to couple the node 208.1 to one or more clients 204.1/204.2 over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network, a Fibre Channel network or any other network type. Each client 204.1/204.2 may communicate with the node over network 206 by exchanging discrete frames or packets of data according to predefined protocols, such as TCP/IP.

The storage adapter 316 cooperates with the storage operating system 306 executing at node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 3B:
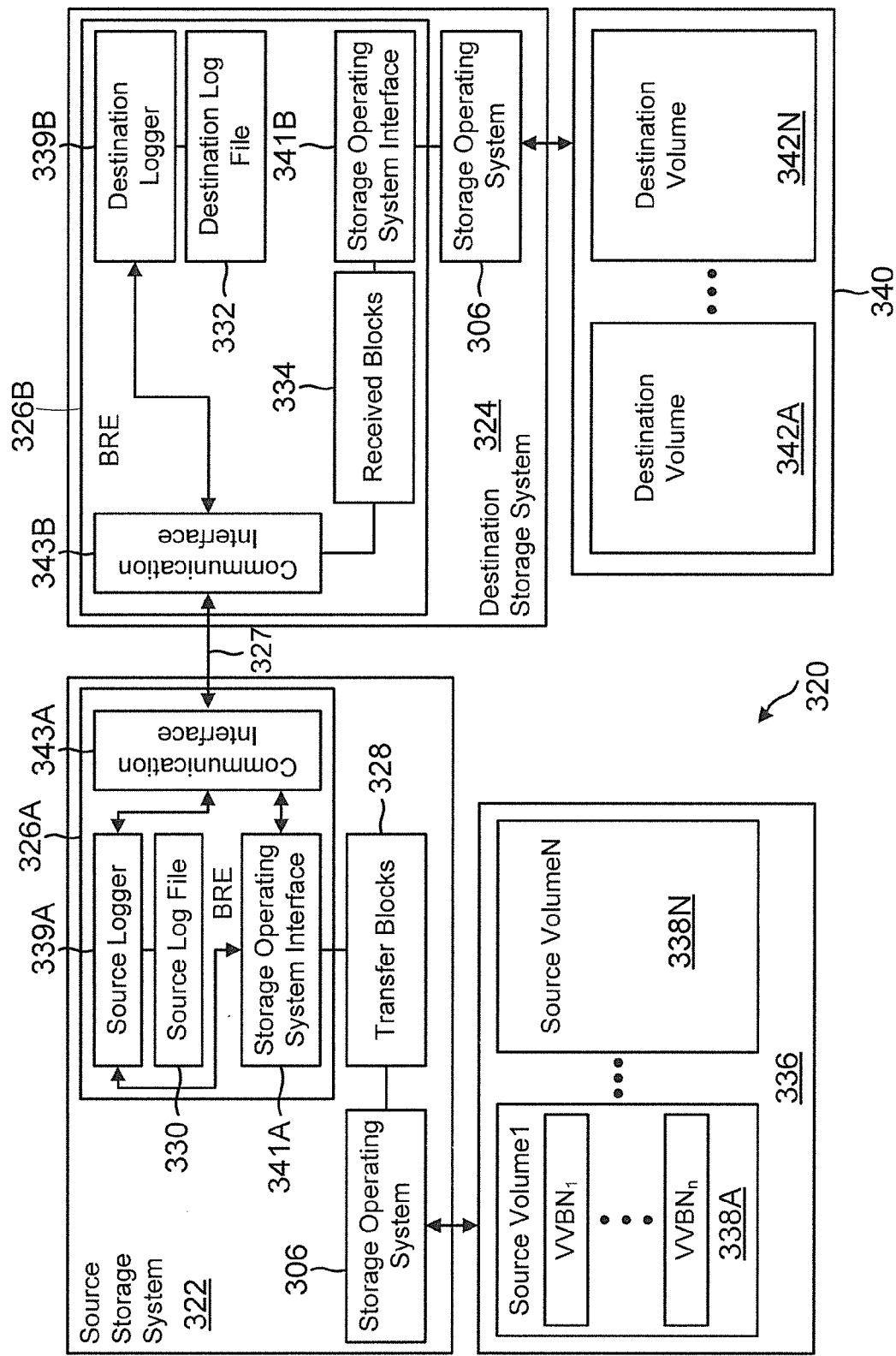
FIG. 3B shows a high level system for transferring information from a source storage system to a destination storage system, according to one aspect of the present disclosure.

Tracking Data Transfer:

FIG. 3B shows a system 320 for tracking information that is transferred from a source storage system 322 (similar to 108/202) to a destination storage system 324 (similar to 108/202) via link 327. The source storage system 322 and the destination storage system 324 may operate within a clustered or a non-clustered environment. The adaptive aspects are not limited to any storage environment.

One common technique used for transferring information is snapshot and SnapMirror technologies (Without derogation of any trademark rights of NetApp Inc.) A snapshot is a point in time copy of a storage volume (for example, Vol1 338A, FIG. 3B). A base snapshot of a source storage volume is typically taken at any given time and transferred via link 327. Subsequent changes to the storage volume are transferred using SnapMirror technology, where the changed storage blocks are periodically sent to the destination. The updated snapshots can be used for disaster recovery. For proper disaster recovery, the blocks at the destination should be identical to the source blocks.

Sometimes information stored at storage blocks at the destination storage system 324 and the source storage system 322 may be different. This may be because one or more data blocks may be present at the source but not at the destination. For example, data blocks D1, D2, D3 . . . Dn storing information may be present at a source volume but not all the blocks may be written at the destination storage system.

The disparity between the source storage system 322 and destination storage system 324 may be due to various reasons. For example, the source storage system 322 may have failed to transfer a block, the network link 327 may have gone down, information may have been delivered but not written at the destination and so forth. The various aspects described below provide a mechanism where all the information transferred from the source storage system 322 is logged and all the information that is received at the destination storage system 324 is logged.

Referring back to FIG. 3B, the storage operating system 306 at the source storage system 322 manages a plurality of storage volumes 338A-338N associated with storage space at a storage sub-system 336 (similar to 111). Data associated with the volumes is stored using logical storage blocks that are managed by logical block numbers within a vbn space. The logical block numbers are shown as VVBN1-VVBNn. The data associated with the logical blocks is stored at the physical storage devices.

The source storage system 322 also executes a block replication engine (BRE) 328A to transfer storage blocks 328 for a storage volume to the destination storage system 324. Any reference to transfer of storage blocks or information means transfer of information stored at physical storage devices represented by logical storage blocks. BRE 328A uses a block replication protocol that is used to transfer information via the network link 327. One example of a block replication protocol is the SpinNp protocol provided by NetApp Inc, the assignee of the present application and without derogation of any trademark rights of NetApp Inc. Details of SpinNp are not germane to the aspects disclosed herein and the aspects disclosed herein are not limited to any particular block replication protocol.

In one aspect, BRE 326A includes a source logger 339A (also referred to as logger 339A) that maintains a source log transfer file (a first data structure/source log data structure and may be referred to as source log file) 330 to track storage blocks that are transferred from the source storage system 322. The source log file 330 may be a "sparse" file for which actual, physical storage space is allocated when it is needed, as described below in detail.

The source log file 330 includes a bitmap having a plurality of bits. Each bit within the bitmap corresponds to a storage block from among the transferred storage blocks 328. A bit value indicates if a storage block from among storage blocks 328 has been transferred by BRE 326A.

In one aspect, source logger 339A uses a memory cache (not shown) for storing multiple blocks for the source log file 330. When a bit needs to be set in a block that is not in the cache, then the least recently used block is flushed to a persistent storage device to provide space for the block that is needed.

The destination storage system 324 executes the storage operating system 306 and includes a storage sub-system 340, similar to 336. The destination storage system 324 also maintains storage volumes 342A-342N, similar to storage volumes 338A-338N. The destination storage system 324 executes a BRE 326B that interfaces with BRE 326A via link 327. The storage blocks transferred from BRE 326A are received by BRE 326B. The received storage blocks are shown as 334 and written to a destination storage volume (for example, 342A-342N).

BRE 326B also executes a destination logger 339B (also referred to as logger 339B) according to one aspect. The destination logger 339B maintains a destination log transfer file (a second data structure/destination log data structure and may be referred to as destination log file) 332 that is similar to the source log file 330. The destination log file 332 also includes a bitmap with a plurality of bits, where each bit corresponds to a storage block received by BRE 326B. The destination log file 332 is also a sparse file like the source log file 330.

In one aspect, the source log file 330 and the destination log file 332 are generated at different time intervals. For example, at time T1, the source log file 330 may be designated as Ls for a given transfer. When the transfer is complete, Ls may be moved to persistence storage as Ls-old and a new log file Ls may be created.

The log files can be compared after a transfer operation to determine if all the storage blocks were successfully transferred from the source storage system 322 and received at the destination storage system 324. If the bitmaps at the source and destination log files don't match, then an error can be generated for the storage management application 118 (FIG. 1) so that corrective action can be initiated.

If a transfer operation is aborted for some reason and re-started, then the log files can be used to determine which storage blocks were successfully transferred before the operation was aborted. This allows one to only transfer storage blocks that did not get transferred before the transfer operation was aborted.

Figure 3C:
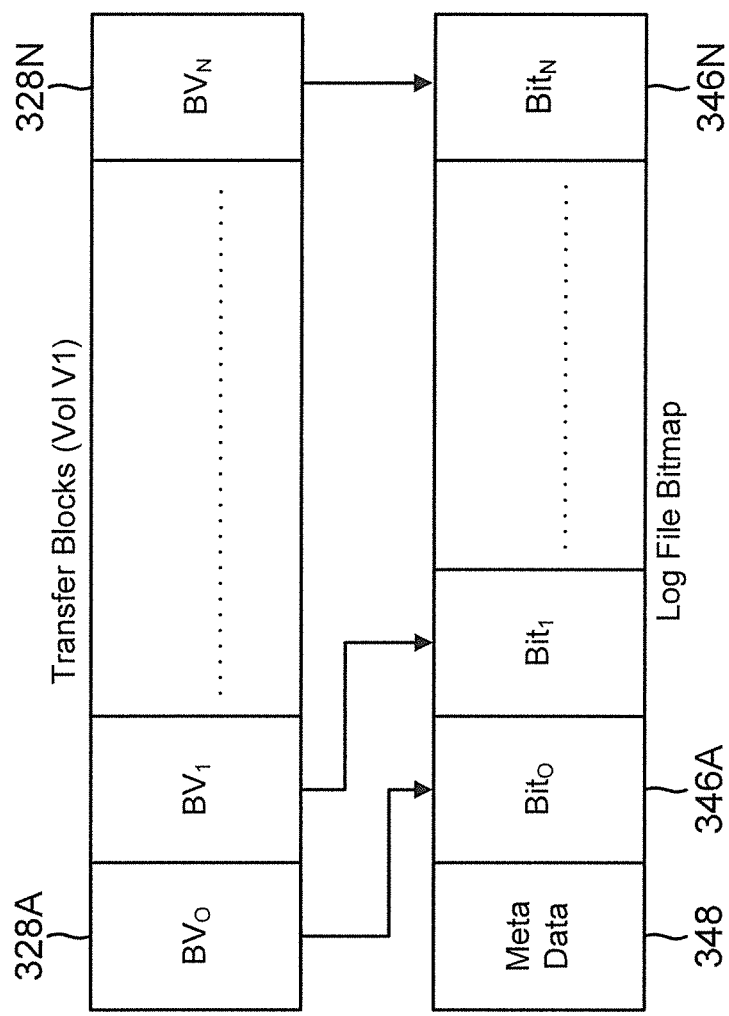
FIG. 3C shows an example of associating a transferred block to a bitmap of a log file that is used to track data transfer between storage systems, according to one aspect of the present disclosure.

FIG. 3C shows storage blocks 328A-328N that are transferred by BRE 326A to the destination storage system 324. Each storage block is uniquely identified by a block number (shown as BV0-BVN). When a storage block (for example, BV0) is transferred (i.e. information associated with the storage block), then a corresponding bit at a bitmap 346 of the source log file 330 is set. For example, bit0 346A corresponding to BV0 is set when the block is transferred. BitN 346N is set when the block identified as BVN is transferred.

Metadata 348 is used to describe the source log file 330. Metadata 348 may include size of the source log file, a pointer to the storage location where the data is stored and other attributes.

A bitmap similar to 346 is also used by the destination log file 332 to track storage blocks that are successfully received. By comparing the bitmaps at the source and destination, one is able to determine if storage blocks were successfully transferred.

In one aspect, bitmap 346 is stored at an assigned physical storage block of certain size, for example, a block size of 4k. Since one bit is used to track one transferred storage block (for example, of 4k size), the physical space used by the log files is very efficient. For example, one 4k physical storage block used by the log file (source or destination) includes 32k bits. The 32k bits can be used to track 32*1024 storage blocks that are transferred. Thus a first log file block can keep track of 0-32*1024-1 transferred storage blocks, while a second log file block can keep track of (32*1024-32*1024*2-1) transferred storage blocks and so on.

Physical storage space for a block in the log files is allocated only if at least one bit needs to be set at a bitmap for that block. For example, in FIG. 3C, the actual physical space for bitmap 346 is not allocated, until a bit from among 346A-346N is ready to be set indicating that one of the blocks 328A-328N has been transferred. Thus this "sparse file" approach only commits or uses physical storage space when the physical storage space is needed. This optimizes the use of physical storage space.

Figure 3D:
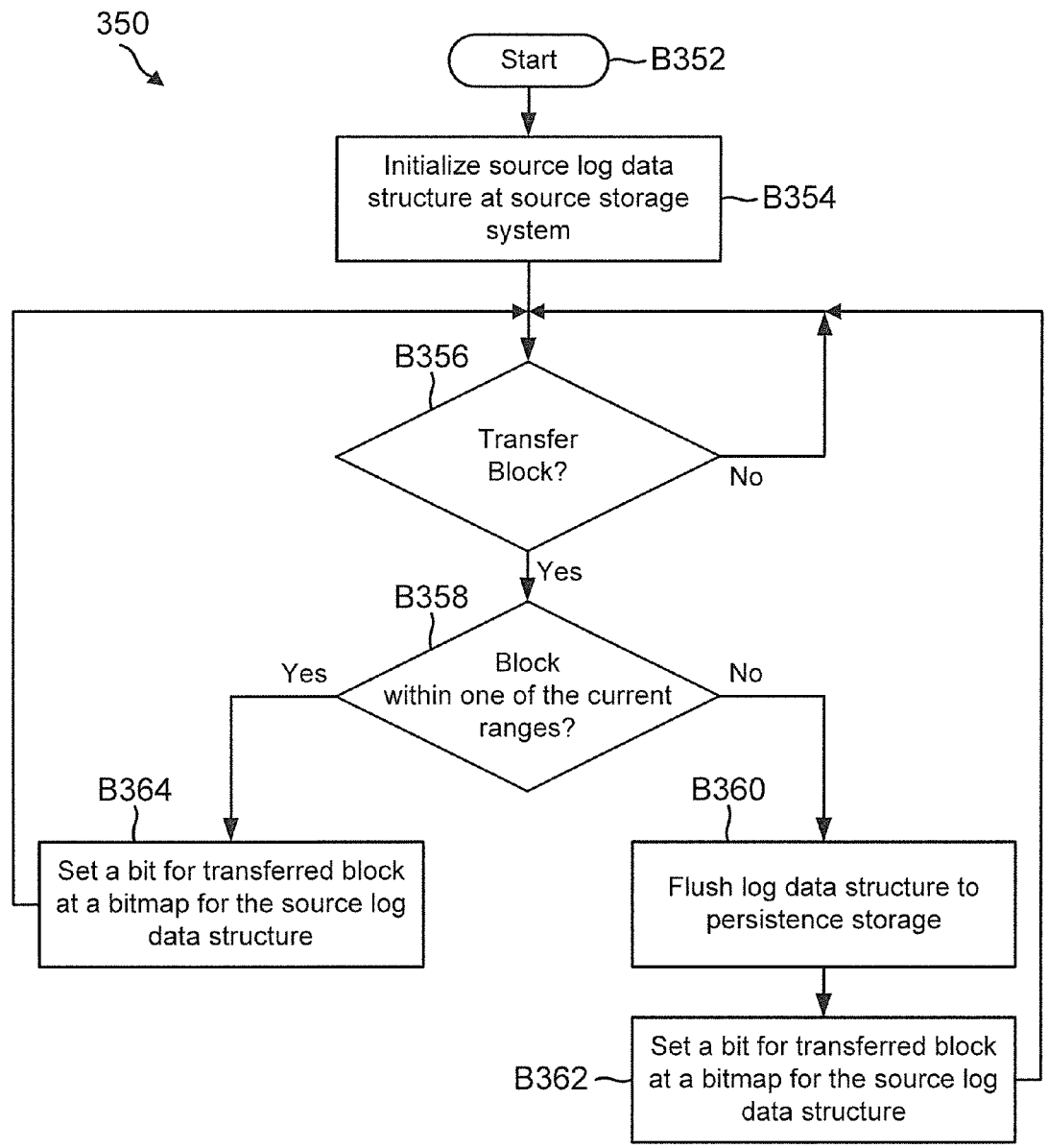
FIGS. 3D-3F show process flow diagrams according to the various aspects of the present disclosure.

Process Flow:

FIG. 3D shows a process 350 for using the source log file 330 by the source logger 339A, according to one aspect. The process begins In B352, when storage blocks (or information stored at physical storage associated with the storage blocks) 328 are ready to be transferred from the source storage system 322 to the destination storage system 324. The storage operating 306 presents the storage blocks 328 to BRE 326A for the transfer. The storage blocks 328 may be ready for transfer in response to a migration operation or for any other reason.

In B354, source logger 339A initializes the source log file 330 at a memory location (for example, 304, FIG. 3A). Actual physical storage blocks for the source log file 330 are not allocated until a bit associated with a transferred storage block is ready to be set In B356, BRE 326A determines if a storage block can be transferred. If there is no storage block or a storage block cannot be transferred, the process simply waits.

If a storage block is ready to be transferred, then in B358, the logger 339A determines if a storage block is within a "current" range or a plurality of "current ranges". BRE 326A transfers a set of storage blocks at any given time. The storage blocks that are being transferred are within a range, for example, when storage Block 0-Block 9 are being transferred, then storage Block 1 is within the current range, for example, R1. When a storage block B10 is ready to be transferred, then storage block B10 is not in the current range R1. It is noteworthy, that BRE 326A may maintain a plurality of ranges for which it may be transferring information.

If the storage block is not within one of the current ranges, then in block B360, the bitmap associated with a least recently used current range is flushed from memory to a persistence storage device similar to the local storage 318 described above with respect to FIG. 3A. Thereafter, in B362, a bit associated with the transferred storage block is set at the source log file 330.

If in B358, the process determines that the storage block is within one of the current ranges, then in B364, a bit for the transferred storage block is set at a bitmap of the source log file 330. The process then reverts back to B356, until the transfer operation is completed.

Figure 3E:
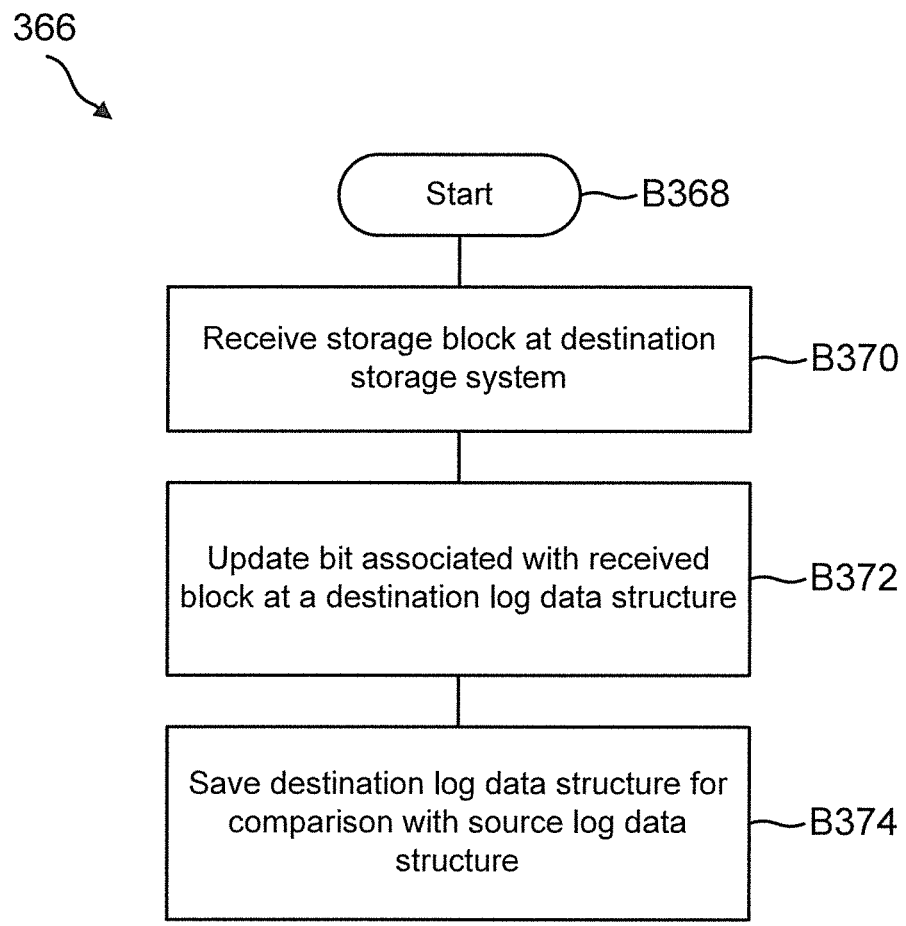

FIG. 3E shows a process 366 for updating the destination log file 332, according to one aspect. The process begins in B368, when BRE 326B is operational and initialized to receive storage blocks via link 327 from BRE 326A. The storage blocks may be received as part of a migration/replication operation or for any other reason.

In B370, a storage block is received at BRE 326B. In B372, logger 339B updates a bit associated with the received storage block in a bitmap of the destination log file 332. In B374, the destination log file 332 is saved at a storage device for comparison with the source log file 330. The comparison is performed to determine if all the storage blocks from the source storage system 322 have been successfully received at the destination storage system 324.

Figure 3F:
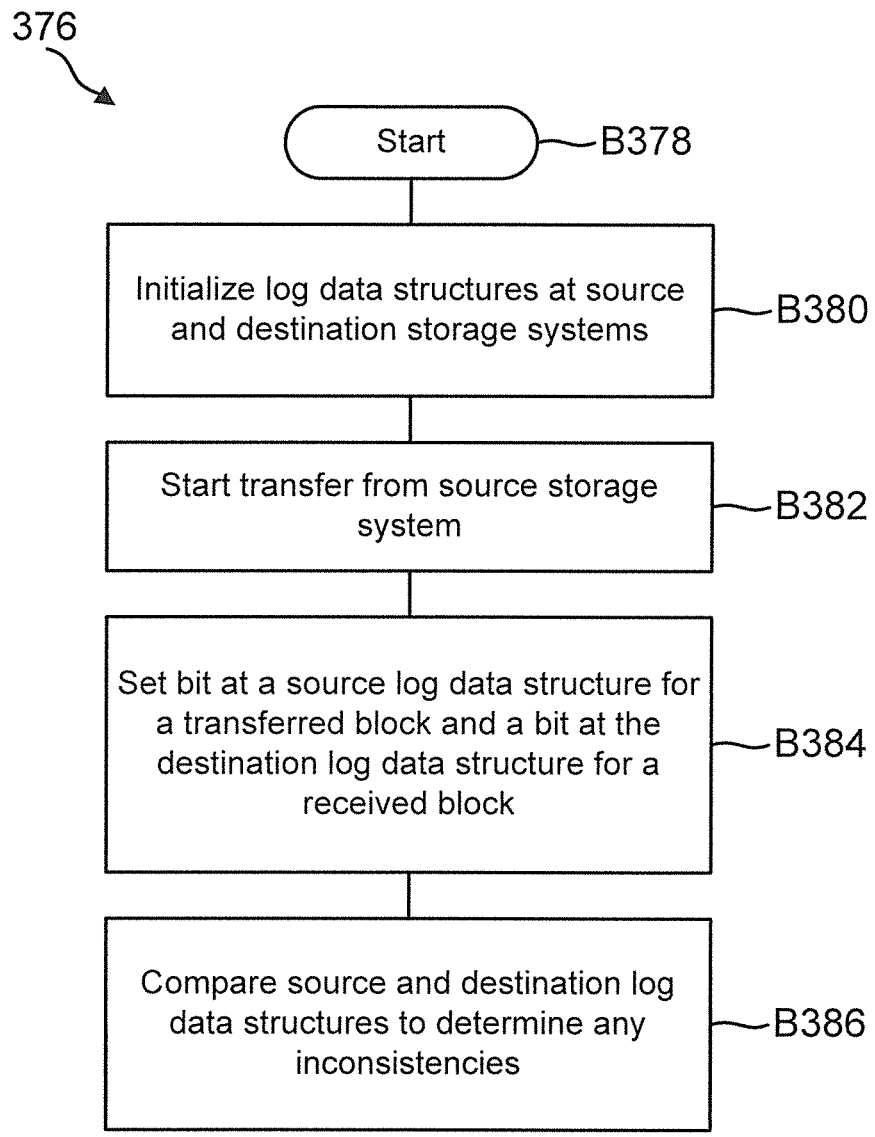

FIG. 3F shows a process flow 376 for comparing the source and destination log files, according to one aspect. The process starts in B378, when BRE 326A and 326B are operational and initialized for transferring and receiving storage blocks. The transfer process begins in 3382 after the source and destination log files are initialized in block B380.

In B384, when a storage block is transferred, then a bit associated with the storage block is set at the source log file 330. When the storage block is received by the destination storage system, then a bit at the destination log file 332 is set.

In B386, after the transfer is completed, the source and the destination log files are compared to determine if there were any errors during the transfer. In one aspect, bit values associated with individual storage blocks are compared to determine which storage blocks may not have been transferred successfully. If there are any inconsistencies in the source and destination file, for example, if a bit value at the source log file indicates that a storage block was transferred but the same bit value at the destination log file indicates that it was not received, then the storage administrator may be notified so that the affected storage blocks can be resent.

Figure 4:
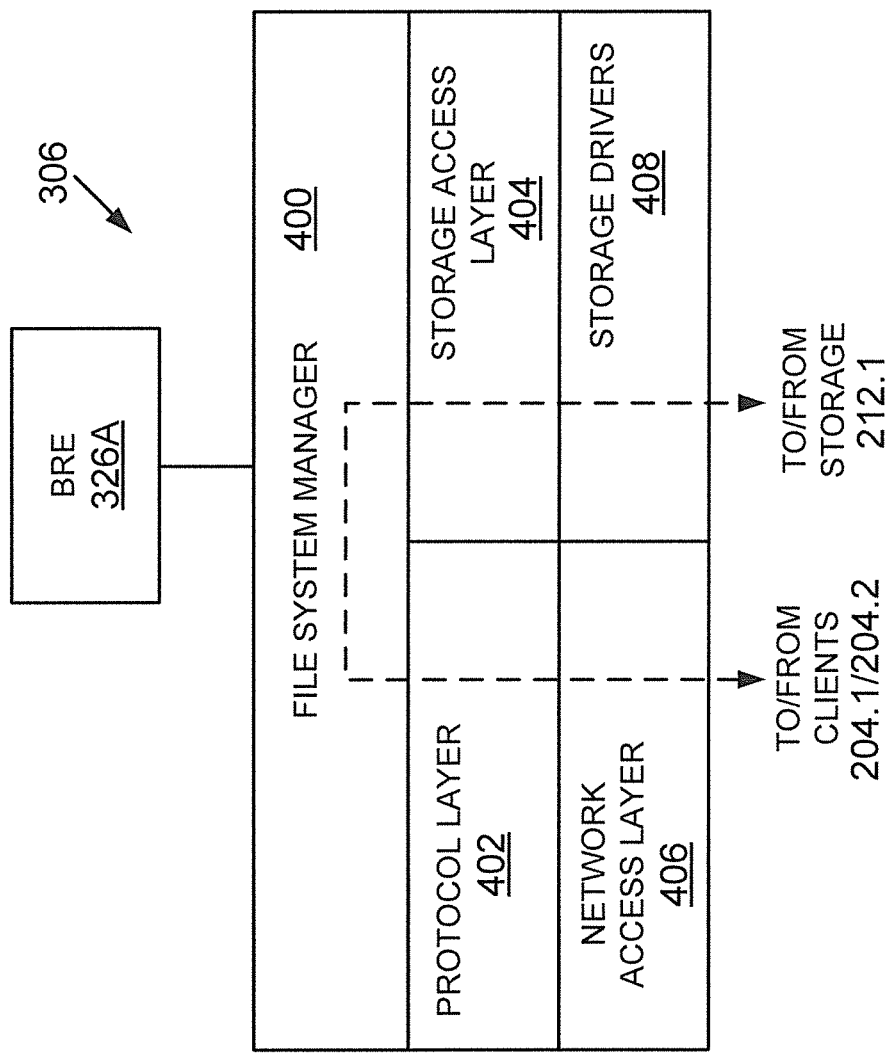
FIG. 4 shows a block diagram of an operating system, used according to one aspect of the present disclosure.

Operating System:

FIG. 4 illustrates a generic example of storage operating system 306 executed by node 208.1, according to one aspect of the present disclosure. The storage operating system 306 manages all the storage volumes and conducts read and write operations. The storage operating system 306 interfaces with BRE 362A at the source side and 326B at the destination side for transferring information from the source storage system to the destination storage system.

In one example, storage operating system 306 may include several modules, or "layers" executed by one or both of N-Module 214 and D-Module 216. These layers include a file system manager 400 that keeps track of a directory structure (hierarchy) of the data stored in storage devices and manages read/write operations, executes read/write operations on storage in response to client 204.1/204.2 requests.

Operating system 306 may also include a protocol layer 402 and an associated network access layer 406, to allow node 208.1 to communicate over a network with other systems, such as clients 204.1/204.2. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients' 204.1/204.2 and mass storage devices 212.1 are illustrated schematically as a path, which illustrates the flow of data through operating system 306.

The operating system 306 may also include a storage access layer 404 and an associated storage driver layer 408 to allow D-module 216 to communicate with a storage device. The storage access layer 404 may implement a higher-level storage protocol, such as RAID, while the storage driver layer 408 may implement a lower-level storage device access protocol, such as FC or SCSI.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the various inventive aspects described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
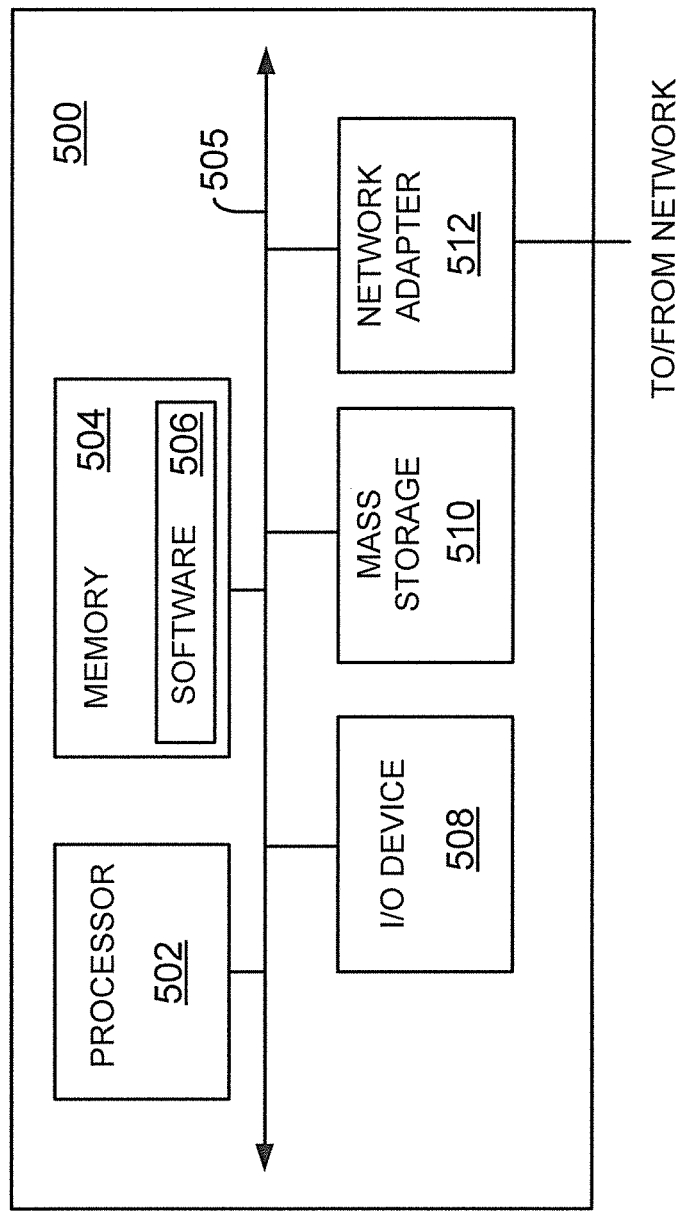
FIG. 5 shows an example of a processing system used according to one aspect of the present disclosure.

Processing System:

FIG. 5 is a high-level block diagram showing an example of the architecture of a processing system that may be used according to one aspect. The processing system 500 can represent management console 120, client 104 or storage system 108, for example. Note that certain standard and well-known components which are not germane to the present disclosure are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 which implement the process steps described above may reside in and execute (by processors 502) from memory 504.

Also connected to the processors 502 through the bus system 505 are one or more internal mass storage devices 510, and a network adapter 512. Internal mass storage devices 510 may be or include any conventional medium for storing large volumes of data in a non-volatile manner, such as one or more magnetic or optical based disks. The network adapter 512 provides the processing system 500 with the ability to communicate with remote devices (e.g., storage servers 20) over a network and may be, for example, an Ethernet adapter, a Fibre Channel adapter, or the like.

The processing system 500 also includes one or more input/output (I/O) devices 508 coupled to the bus system 63. The I/O devices 508 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. After the application layer, is a cloud platform and cloud infrastructure, followed by a "server" layer that includes hardware and computer software designed for cloud specific services. In this example, a source storage system and a destination storage system may be presented in a cloud for storing information.

Thus, a method and apparatus for tracking information transferred from a source system to a destination system have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising:
receiving, at a second storage system, a storage block transferred from a first storage system that maintains a first data structure used for indicating that the storage block is transferred;
updating a second data structure, maintained at the second storage system, to indicate that the storage block has been received; and
comparing the first data structure, maintained at the first storage system, and the second data structure, maintained at the second storage system, to determine if the storage block was successfully transferred from the first storage system and received at the second storage system.

2. The method of claim 1, wherein the first data structure is a source log file.

3. The method of claim 2, wherein the source log file comprises a bitmap and the method further comprising:
updating a bit, of the bitmap, corresponding to the storage block to indicate the transfer of the storage block to the second storage system.

4. The method of claim 1, wherein the second data structure is a destination log file.

5. The method of claim 4, wherein the destination log file comprises a bitmap and the method further comprising:
updating a bit, of the bitmap, corresponding to the storage block to indicate that the storage block has been received at the second storage system.

6. The method of claim 1, wherein the first data structure is a sparse file for which storage space is allocated when the storage block is transferred from the first storage system.

7. The method of claim 1, wherein the second data structure is a sparse file for which storage space is allocated when the storage block is received at the second storage system.

8. The method of claim 1, wherein the first data structure is maintained by a block replication engine that transfers the storage block from the first storage system.

9. The method of claim 1, wherein the second data structure is maintained by a block replication engine that receives the storage block at the second storage system.

10. The method of claim 1, further comprising:
responsive to an abort of a transfer of data comprising the storage block, comparing the first data structure and the second data structure to identify storage blocks of the transfer that were not transferred before the abort; and
resuming the transfer based upon the identified storage blocks.

11. The method of claim 1, further comprising:
retaining storage block transfer tracking information within the first data structure and the second data structure after completion of a transfer of data comprising the storage block;
responsive to completion of the transfer of data, comparing the first data structure and the second data structure to determine whether a transfer error occurred; and
responsive to the transfer error occurring, providing a notification that data associated with the transfer error is to be retransmitted to the second storage system.

12. A method comprising:
receiving a storage block, at a second storage system, transferred from a first storage system that maintains a first data structure used for indicating that the storage block is transferred, wherein the first data structure includes a first bitmap having a bit, corresponding to the storage block, that is updated to indicate the transfer of the storage block to the second storage system;
updating a second data structure, maintained at the second storage system, to indicate that the storage block has been received, wherein the second data structure includes a second bitmap having a bit, corresponding to the storage block, that is updated to indicate that the storage block has been received at the second storage system; and
comparing the first bitmap, maintained at the first storage system, and the second bitmap, maintained at the second storage system, to determine that the storage block was successfully transferred from the first storage system.

13. The method of claim 12, wherein the first data structure is a source log file and the second data structure is a destination log file.

14. The method of claim 12, wherein the first data structure is a sparse file for which storage space is allocated when the storage block is transferred from the first storage system and the second data structure is a sparse file for which storage space is allocated when the storage block is received at the second storage system.

15. A non-transitory machine readable medium having stored thereon instructions for performing a method comprising machine executable code which when executed by at least one machine, causes the machine to:
receive, at a second storage system, a storage block transferred from a first storage system that maintains a first data structure used for indicating that the storage block is transferred;
update a second data structure, maintained at the second storage system, to indicate that the storage block has been received; and
compare the first data structure, maintained at the first storage system, and the second data structure, maintained at the second storage system, to determine if the storage block was successfully transferred from the first storage system and received at the second storage system.

16. The non-transitory machine readable medium of claim 15, wherein the first data structure is a sparse file for which storage space is allocated when the storage block is transferred from the first storage system.

17. The non-transitory machine readable medium of claim 15, wherein the second data structure is a sparse file for which storage space is allocated when the storage block is received at the second storage system.

18. A computing device, comprising:
a memory containing machine readable medium comprising machine executable code having stored thereon instructions for performing a method; and
a processor, coupled to the memory, for a second storage system, the processor configured to execute the machine executable code to cause the processor to:
receive a storage block transferred from a first storage system that maintains a first data structure used for indicating that the storage block is transferred;
update a second data structure, maintained at the second storage system, to indicate that the storage block has been received; and
compare the first data structure, maintained at the first storage system, and the second data structure, maintained at the second storage system, to determine if the storage block was successfully transferred from the first storage system and received by the second storage system.

19. The computing device of claim 18, wherein the first data structure is a sparse file for which storage space is allocated when the storage block is transferred from the first storage system.

20. The computing device of claim 18, wherein the second data structure is a sparse file for which storage space is allocated when the storage block is received at the second storage system.

* * * * *